Patented Sept. 3, 1946

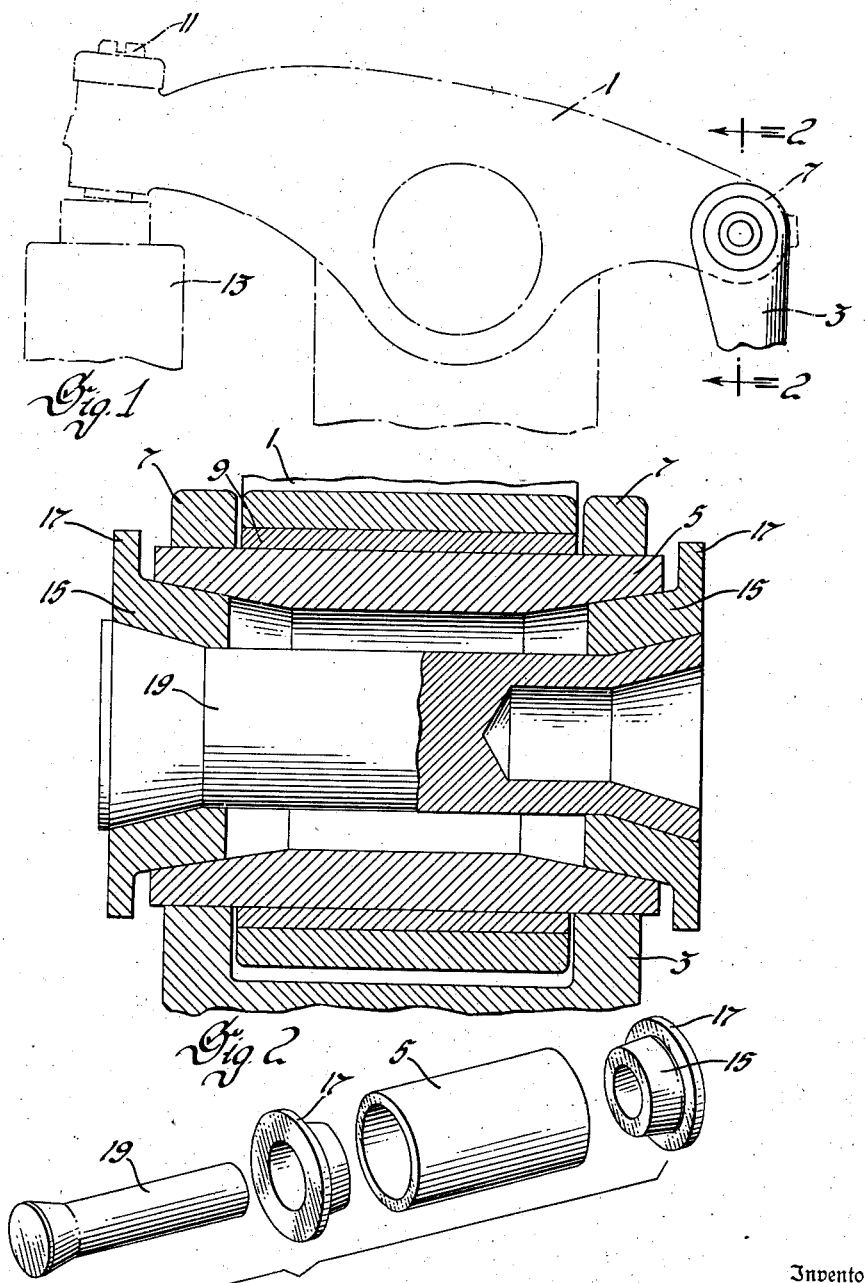

2,406,940

UNITED STATES PATENT OFFICE 2,406,940
PIVOT PIN

William E. Brill, Cleveland, Ohio, assignor to General Motors Corporation, Detroit, Mich., a corporation of Delaware Application June 19, 1944, Serial No. 541,106

7 Claims. (Cl. 287—96)

The present invention generally relates to pivot pins and more particularly to hardened and expansible pivot pins.

It is well known that the pivot pins commonly used in highly stressed clevis type connections, such as cam follower rollers, valve operating mechanisms and the like, must be anchored firmly at the ends thereof to the narrow legs of the followers or clevises in order to prevent looseness at these points on account of the limited bearing area available at these points. The usual pins for this purpose are hardened and ground for a push fit in openings in the narrow legs of the clevis members and means are provided on the ends of the pin to prevent outward movement of the pin upon wear of the pin or clevis or upon enlargement of the clevis openings due to the limited bearing area at these points.

The object of the present invention is to provide a hollow pivot pin which may be hardened and ground for a push fit in openings in narrow legs of a support member and to be firmly anchored therein by expansion of the pin at these points by means of hollow conical plugs pressed endwise into internal conical surfaces in the ends of pins adjacent the points of anchorage.

Another object of the invention is to provide tension means located entirely within and between the conical plugs in order to maintain the ends of the pin firmly anchored in the openings in the clevis and to provide thin external retaining flanges on the plugs to prevent outward movement of the pin from the openings.

In order that the invention, the objects and nature of which have been set forth, may be readily understood, reference will now be had to the following detailed description and accompanying sheet of drawings wherein:

Figure 1 of the drawing is a reduced end elevational view of a fuel injector operating linkage including a pivot pin constructed in accordance with the present invention.

Figure 2 is an enlarged cross sectional view taken on line 2—2 of Figure 1 with parts broken away to show details of the pivot pin.

Figure 3 is an enlarged exploded view of the elements of the pin assembly, shown in axial spaced relation.

Corresponding and like parts are referred to in the following description and indicated in the drawing by the same character references.

The linkage connection embodying the pivot pin construction of the present invention comprises an engine fuel injector operating lever 1, pivoted on an engine cylinder head and connected by the pivot pin to a clevis portion 3 of a push rod in conventional manner.

The pivot pin 5 is of hollow cylindrical form and is provided with interiorly tapered portions adjacent the ends thereof. The pin is hardened and the exterior surface is ground for a hand push fit in openings in the narrow legs 7 of the clevis 3 and extends through a bushing 9 carried in one end of the injector actuation lever 1, the other end of which carries an adjusting screw 11 adapted to contact and actuate a fuel injector 13. The opposite ends of the pin are adapted to be expanded into tight contact with the openings in the narrow leg portions of the clevis by hardened plugs or collars 15 each having a tapered central opening and a tapered exterior surface and a thin retaining flange 17 adjacent thereto of larger diameter than the clevis openings. The plugs are pressed in the ends of the pin so that the tapered exterior surfaces thereon engage the interiorly tapered end portions of the pin and cause expansion thereof into firm contact with the clevis openings. In order to retain the collars in tight contact with the ends of the pins a heated rivet 19 having a tapered head and a hollow shank portion is inserted through the central opening in each collar and the hollow shank, while hot, is upset into contact with one of the collars. It will be evident that when the rivet cools and contracts, tension will be applied directly between the collars to retain the collars in the tapered ends of the pin so that the ends of the pin will be maintained expanded in the openings in the narrow legs of the clevis. The rivet and the flanges on the collars also serve as means to prevent outward movement of the pin from the clevis in case looseness occurs between the ends of the pin and the clevis openings.

The above described pin construction provides means whereby a pivot pin may be firmly anchored in openings in narrow legs of a clevis, cam follower or other similar bifurcated member to prevent movement therein and wear or looseness between the pin and member. By proper selection of the pin and collar material and proper dimensions of the pin ends, the collars may be used to expand the ends of the pins and then removed or retained in the ends of the pin by the rivet in the manner described whereby the rivet and retaining flanges serve as a safety retaining means to prevent movement of the pin from the member to which the pin is anchored. Disassembly of the connection is accomplished by drilling the upset hollow end of the rivet out of the collar and driving the pin out of the clevis.

It will be evident that the pin construction described prevents bending or twisting of the narrow legs of the pin supporting member when the collars are pressed in the pin or when the rivet is upset as the force applied endwise of the pin for accomplishing these operations merely causes expansion of the ends of the pin into firm contact with the openings provided in the narrow legs of the pin supporting member. The amount of expansion of the pin ends may be easily determined by measuring the distance between the collars to prevent overstressing of the pin and clevis.

I claim:

1. A pivot pin assembly comprising a pivot pin having a cylindrical exterior surface, internally tapered end portions and tapered plugs adapted to be pressed into said tapered end portions of said pin to expand the ends of the pin.

2. A pivot pin assembly comprising a hollow pivot pin having internally tapered end portions, tapered collars adapted to be pressed into the tapered end portions of said pin to expand these portions, said collars having internally tapered portions and tension means adapted to contact the internally tapered portions in said collars to retain the collars in contact with the ends of the pin in order to keep said end portions of said pin expanded.

3. A pivot pin assembly comprising a hollow pivot pin having internally tapered end portions, collars having a circumferential retaining flange of greater diameter than the pin, an externally tapered portion adjacent said flange adapted to be pressed into said tapered end portions of said pin to expand said pin end portions and internally tapered portions in said collars, and a rivet extending through said collars and said hollow pin and provided with heads in contact with the internally tapered portions of the collars for urging said collars into tight contact with the end portions of said pin to keep said end portions expanded.

4. A pivot pin assembly comprising a hardened hollow cylindrical pivot pin having internally tapered end portions, hardened tapered collars having a thin circumferential retaining flange of greater diameter than said pin, the tapered collars being adapted to be pressed into said tapered end portions of said pin to expand said end portions, and a rivet extending through said pin and collars, said rivet having heads bearing on said collars to exert tension therebetween to maintain the ends of the pin expanded.

5. A mechanical connection comprising a supporting member having aligned openings therein, a pivot pin having a cylindrical exterior surface and internally tapered end portions, said pin being adapted to be snugly entered into the aligned openings in said member, and externally tapered members adapted to be pressed into said tapered end portions of said pin to expand said end portions into tight frictional contact with the openings of said supporting member.

6. A mechanical connection comprising a supporting member having thin legs spaced apart and aligned openings therein, a hollow pivot pin having internally tapered end portions, the end portions of said pin being adapted for snug entry into the aligned openings in the legs of said member, collars having a thin circumferential retaining flange of greater diameter than the openings in the legs of said supporting member, said collars also having internally and externally tapered portions, the externally tapered portions of the collars being adapted to be pressed into the internally tapered end portions of said pin to expand these portions into firm contact with the openings in the legs of said supporting member, and a rivet extending through said hollow pin and said collars and provided with tapered ends in contact with the internally tapered portions of said collars to exert tension between said collars in order to keep the end portions of said pin expanded and to hold the collar retaining flanges adjacent the outer surface of the legs of said member to prevent movement of said pin out of the openings in the legs of said supporting member.

7. A mechanical connection comprising a supporting member having thin legs spaced apart and provided with aligned openings, a hardened hollow pivot pin having internally tapered end portions, the ends of said pin being adapted to be entered snugly into the openings in the thin legs of said member, hardened collars having a thin circumferential retaining flange of greater diameter than said openings in the legs of said supporting member, an external tapered portion adjacent said flange adapted to be pressed into said tapered end portions of said pin to expand the ends of said pin into tight contact with the openings in the legs of said supporting member, and central tapered portions in said collars, and a rivet extending through said pin and said collars adapted to exert tension between the collars to retain the ends of the pin expanded and to position said flanges on said collars adjacent the outer surface of the legs of said supporting member to retain the ends of the pin in said supporting member.

WILLIAM E. BRILL.